(12) United States Patent
Ahmad

(10) Patent No.: US 10,290,033 B1
(45) Date of Patent: May 14, 2019

(54) METHOD, SYSTEM, AND COMPUTER-READABLE MEDIUM FOR WARNING USERS ABOUT UNTRUSTWORTHY APPLICATION PAYMENT PAGES

(71) Applicant: Symantec Corporation, Mountain View, CA (US)

(72) Inventor: Shuaib Ahmad, Tamil Nadu (IN)

(73) Assignee: Symantec Corporation, Mountain View, CA (US)

( * ) Notice: Subject to any disclaimer, the term of this patent is extended or adjusted under 35 U.S.C. 154(b) by 606 days.

(21) Appl. No.: 14/621,415

(22) Filed: Feb. 13, 2015

(51) Int. Cl.
 G06Q 30/00 (2012.01)
 G06Q 30/06 (2012.01)
(52) U.S. Cl.
 CPC .............................. *G06Q 30/0609* (2013.01)
(58) Field of Classification Search
 USPC ...................................................... 705/26.35
 See application file for complete search history.

(56) References Cited

U.S. PATENT DOCUMENTS

| | | | |
|---|---|---|---|
| 8,375,048 B1* | 2/2013 | Wad .................. | G06F 17/30672 707/708 |
| 2011/0270756 A1* | 11/2011 | Tullis ..................... | G06Q 20/10 705/44 |
| 2015/0052005 A1* | 2/2015 | Howe .................... | G06Q 20/40 705/26.8 |

OTHER PUBLICATIONS

"WOT (Web of Trust)", https://www.mywot.com/, as accessed Dec. 17, 2014, (Nov. 18, 2006).

* cited by examiner

*Primary Examiner* — Jeffrey A. Smith
*Assistant Examiner* — Lalith M Duraisamygurusamy
(74) *Attorney, Agent, or Firm* — FisherBroyles, LLP

(57) ABSTRACT

The disclosed computer-implemented method for warning users about untrustworthy application payment pages may include (1) detecting, within an Internet browser, a payment page to purchase an application, (2) determining a source of origin of the payment page, (3) querying a reputation database to determine a reputation of the source of origin of the payment page, (4) receiving a response from the reputation database indicating that the source of origin of the payment page is untrustworthy, and (5) in response to receiving the response that indicates that the source of origin of the payment page is untrustworthy, warning a user of the Internet browser that the source of origin of the payment page is untrustworthy. Various other methods, systems, and computer-readable media are also disclosed.

18 Claims, 7 Drawing Sheets

METHOD, SYSTEM, AND COMPUTER-READABLE MEDIUM FOR WARNING USERS ABOUT UNTRUSTWORTHY APPLICATION PAYMENT PAGES

BACKGROUND

Malware is a common threat to computing systems of all types, and many intellectual and computing resources are dedicated to battling this threat. However, malware is not the only type of problematic application that can affect computer users. Scam applications, which cause no active harm to the computer but also do little or no good, are a threat to users' wallets and their data security. Scam applications may pose as computer cleaning applications, anti-spyware or anti-virus applications, or any other kind of legitimate application. A scam application may even use a similar name to a legitimate application. While some scam applications may perform limited functions, in general they are less effective than legitimate applications that advertise the same services.

Unfortunately, most traditional methods for warning users about untrustworthy applications focus on malware. Traditional systems may scan an application for malicious code or block malicious actions of a piece of malware before they can take effect. However, these methods may not find scam applications that don't perform malicious actions on computing devices. A traditional system that only evaluates an application after download may be unable to prevent a user from wasting money paying for a scam application. Accordingly, the instant disclosure identifies and addresses a need for additional and improved systems and methods for warning users about untrustworthy application payment pages.

SUMMARY

As will be described in greater detail below, the instant disclosure describes various systems and methods for warning users about untrustworthy application payment pages by determining what web page or application is the source of a payment page, determining the trustworthiness of the payment page by looking up the reputation of the source in a reputation database, and informing the user that the payment page is untrustworthy.

In one example, a computer-implemented method for warning users about untrustworthy application payment pages may include (1) detecting, within an Internet browser, a payment page to purchase an application, (2) determining a source of origin of the payment page, (3) querying a reputation database to determine a reputation of the source of origin of the payment page, (4) receiving a response from the reputation database indicating that the source of origin of the payment page is untrustworthy, and (5) in response to receiving the response that indicates that the source of origin of the payment page is untrustworthy, warning a user of the Internet browser that the source of origin of the payment page is untrustworthy.

In some examples, the source of origin may include an additional application. In some embodiments, determining that the source of origin of the payment page includes an additional application may include identifying a parent process that initialized the payment page in the Internet browser. Additionally or alternatively, determining the source of origin of the payment page may include identifying the additional application based on an application programming interface (API) call used by the application to initialize the payment page in the Internet browser. In one example, the additional application may include a free version of the application.

In some examples, the source of origin may include a web page in the Internet browser. In some embodiments, determining the source of origin of the payment page may include identifying the web page that referred the Internet browser to the payment page based on referrer data stored by the Internet browser.

In some embodiments, detecting the payment page may include detecting, within the payment page, (1) a payment card number field, (2) a payment card verification value (CVV) field, (3) a payment card expiration date field, (4) a payment card owner name field, (5) a billing address field, (6) a payment method selection field, and/or (7) a bank name field. In one embodiment, warning the user of the Internet browser may include blocking the payment page for the application from displaying in the Internet browser.

In one embodiment, a system for implementing the above-described method may include (1) a detection module, stored in memory, that detects, within an Internet browser, a payment page to purchase an application, (2) a determination module, stored in memory, that determines a source of origin of the payment page, (3) a querying module, stored in memory, that queries a reputation database to determine a reputation of the source of origin of the payment page, (4) a receiving module, stored in memory, that receives a response from the reputation database indicating that the source of origin of the payment page is untrustworthy, (5) a warning module, stored in memory, that, in response to receiving the response that indicates that the source of origin of the payment page is untrustworthy, warns a user of the Internet browser that the source of origin of the payment page is untrustworthy, and (6) at least one physical processor configured to execute the detection module, the determination module, the querying module, the receiving module, and the warning module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, within an Internet browser, a payment page to purchase an application, (2) determine a source of origin of the payment page, (3) query a reputation database to determine a reputation of the source of origin of the payment page, (4) receive a response from the reputation database indicating that the source of origin of the payment page is untrustworthy, and (5) in response to receiving the response that indicates that the source of origin of the payment page is untrustworthy, warn a user of the Internet browser that the source of origin of the payment page is untrustworthy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
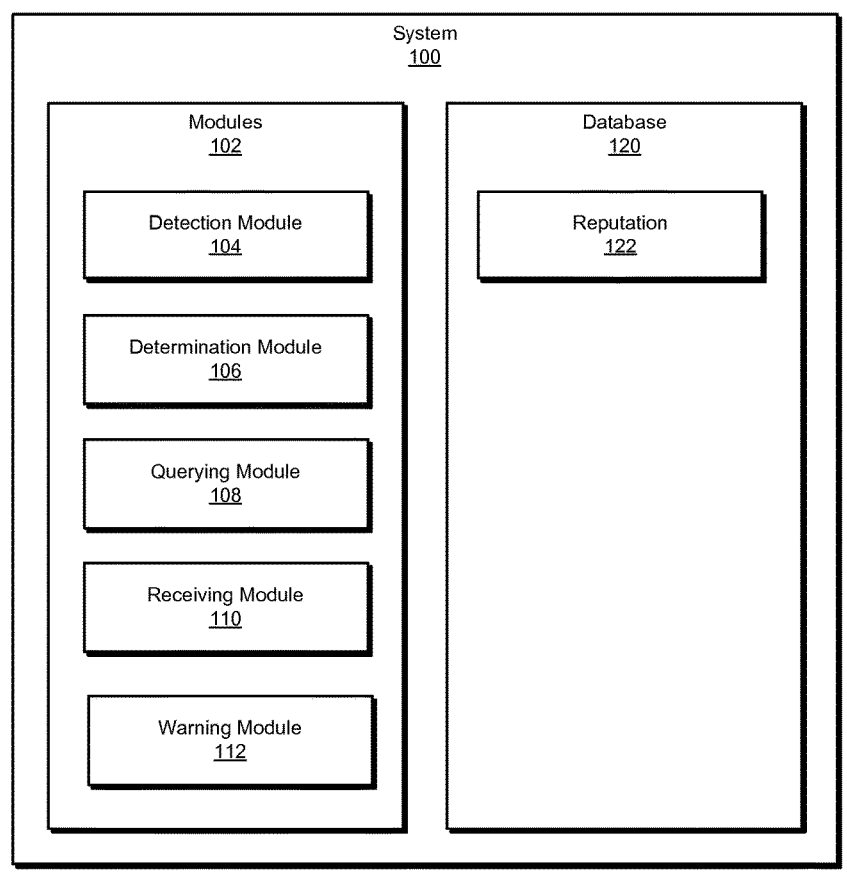
FIG. 1 is a block diagram of an exemplary system for warning users about untrustworthy application payment pages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for warning users about untrustworthy application payment pages. As will be explained in greater detail below, by determining the trustworthiness of the source of an application payment page, and thus the trustworthiness of the payment page itself, the systems described herein may prevent users from wasting money on scam applications by warning a user that the application they are about to enter payment information for is untrustworthy.

Figure 2:
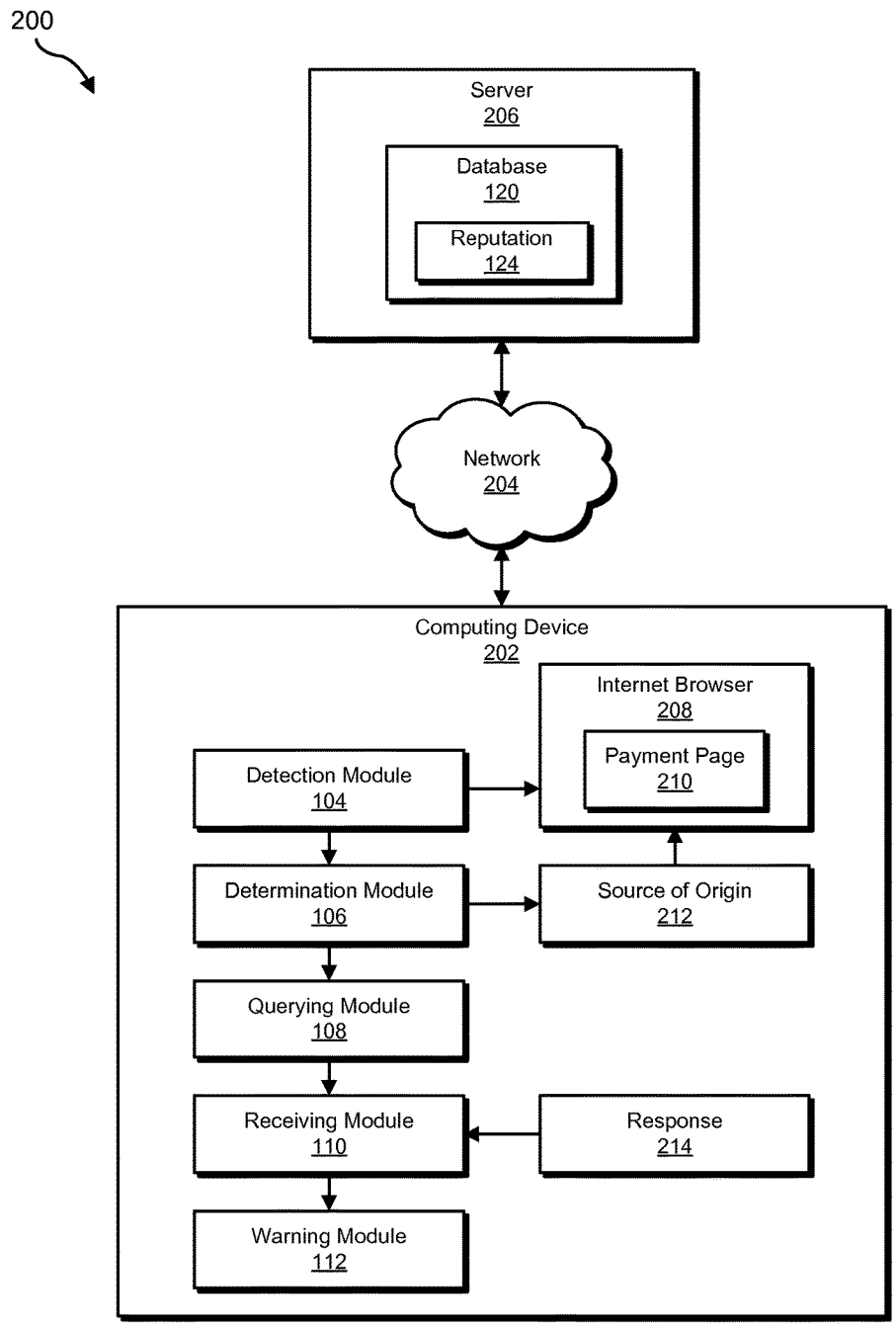
FIG. 2 is a block diagram of an additional exemplary system for warning users about untrustworthy application payment pages.

The following will provide, with reference to FIGS. 1-2, detailed descriptions of exemplary systems for warning users about untrustworthy application payment pages. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for warning users about untrustworthy application payment pages. As illustrated in this figure, exemplary system 100 may include one or more modules 102 for performing one or more tasks. For example, and as will be explained in greater detail below, exemplary system 100 may include a detection module 104 that may detect, within an Internet browser, a payment page to purchase an application. Exemplary system 100 may additionally include a determination module 106 that may determine a source of origin of the payment page. Exemplary system 100 may also include a querying module 108 that may query a reputation database to determine a reputation of the source of origin of the payment page. Exemplary system 100 may additionally include a receiving module 110 that may receive a response from the reputation database indicating that the source of origin of the payment page may be untrustworthy. Exemplary system 100 may also include a warning module 112 that may, in response to receiving the response that indicates that the source of origin of the payment page may be untrustworthy, warn a user of the Internet browser that the source of origin of the payment page may be untrustworthy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store reputation scores for web pages and/or applications. For example, database 120 may include a reputation database such as WEB OF TRUST. Database 120 may collect reputation data from users and/or may be populated with reputation data by administrators.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202, enable computing device 202 to warn users about untrustworthy application payment pages. For example, and as will be described in greater detail below, detection module 104 may detect, within an Internet browser 208, a payment page 210 to purchase an application. Next, determination module 106 may determine a source of origin 212 of payment page 210. Once source of origin 212 has been identified, querying module 108 may query a reputation 124 database 120 to determine a reputation 124 of source of origin 212 of payment page 210. Then, receiving module 110 may receive a response 214 from reputation database 120 indicating that source of origin 212 of payment page 210 is untrustworthy. Finally, warning module 112 may, in response to receiving response 214 that indicates that source of origin 212 of payment page 210 is untrustworthy, warn a user of Internet browser 208 that source of origin 212 of payment page 210 is untrustworthy.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of hosting a database. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
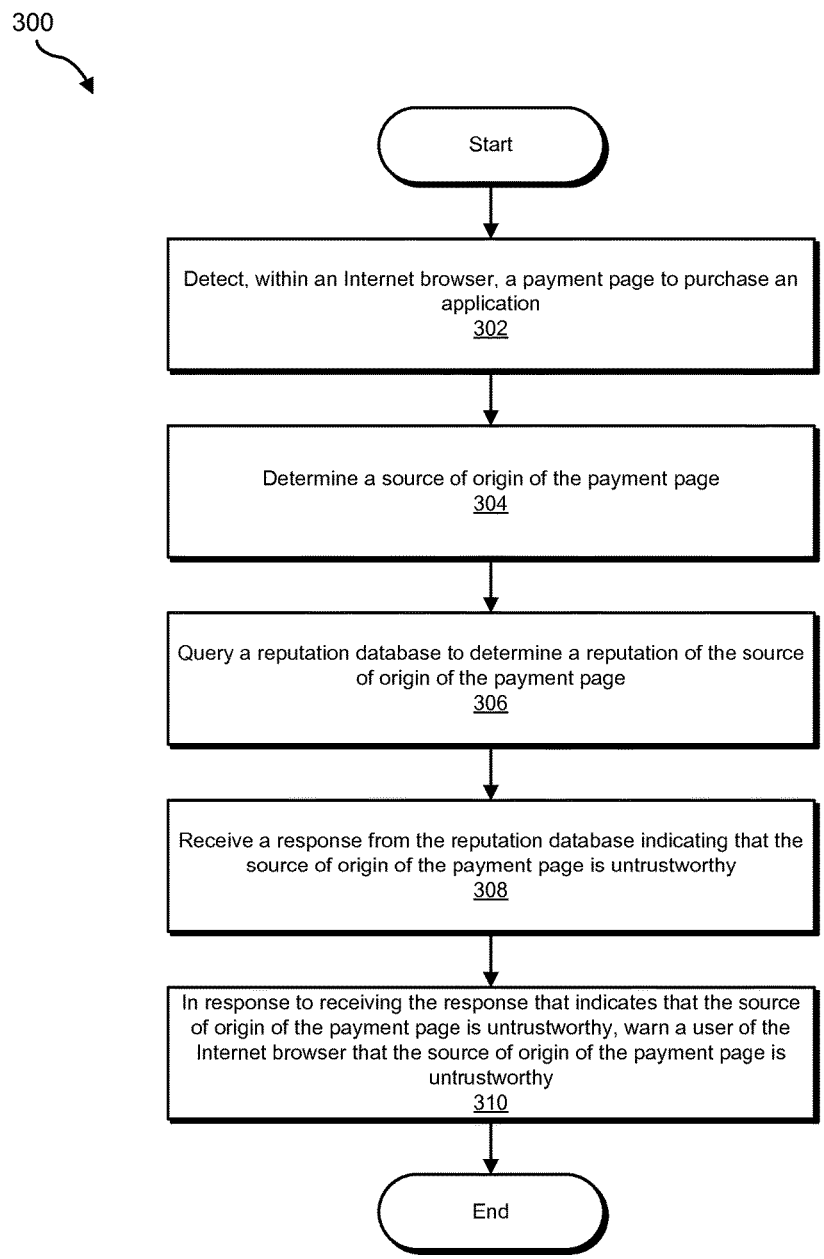
FIG. 3 is a flow diagram of an exemplary method for warning users about untrustworthy application payment pages.

FIG. 3 is a flow diagram of an exemplary computer-implemented method 300 for warning users about untrustworthy application payment pages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect, within an Internet browser, a payment page to purchase an application. For example, detection module 104 may, as part of computing device 202 in FIG. 2, detect, within Internet browser 208, payment page 210 to purchase an application.

The term "Internet browser," as used herein, generally refers to any application that may be used to view resources hosted by a server via the Internet. An Internet browser may be installed on a computing device such as a laptop or desktop computer and/or may be an application on a mobile computing device such as a smartphone. An Internet browser may also be installed on a purpose-built device such as an AMAZON KINDLE and/or a PLAYSTATION. Examples of Internet browsers include, without limitation, INTERNET EXPLORER, GOOGLE CHROME, FIREFOX, SAFARI, ANDROID BROWSER, and/or AMAZON SILK.

The term "payment page," as used herein, generally refers to any web page that may be used to pay for goods and/or services. In some examples, a payment page may be a single step in a payment process that spans multiple pages. For example, a payment page may allow a user to choose between paying via credit card or bank transfer and may then redirect the user to another payment page where the user may input their credit card or bank information. In some examples, a payment page may feature a link to an external payment service such as PAYPAL. Additionally or alternatively, a payment page may include fields for multiple forms of payment and/or other payment information such as a user's name and/or billing address.

The term "application," as used herein, generally refers to any program, operating system, script, plug-in, and/or piece of software for a computing device. Examples of applications that are commonly imitated by scam applications may include anti-virus programs, anti-spyware programs, anti-malware programs, registry cleaning programs, hard drive cleaning programs, and/or computer optimization programs.

Detection module 104 may detect the payment page in a variety of contexts. In one embodiment, detection module 104 may be part of a plug-in for the Internet browser, such as the NORTON toolbar. In another embodiment, detection module 104 may be part of a security application that monitors browser activity and/or Internet traffic. In some embodiments, detection module 104 may detect the payment page automatically by examining every page opened in the Internet browser to determine whether the page is a payment page. Additionally or alternatively, detection module 104 may detect a payment page when manually triggered by a user, for example when a user clicks a button on a security toolbar.

Figure 4:
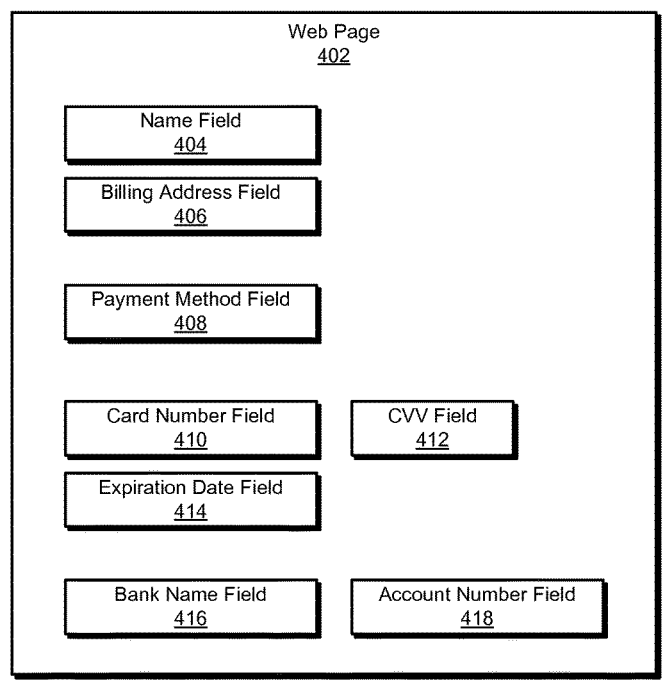
FIG. 4 is a block diagram of an exemplary payment page.

In some examples, detection module 104 may detect a payment page by detecting fields associated with financial transactions on the page. For example, detection module 104 may detect a payment page by detecting, within the payment page, at least one of (1) a payment card number field, (2) a payment card CVV field, (3) a payment card expiration date field, (4) a payment card owner name field, (5) a billing address field, (6) a payment method selection field, and/or (7) a bank name field. As illustrated in FIG. 4, a web page 402 may include a variety of fields. In some examples, a name field 404 may have labels like "name," "credit card owner," and/or may be part of a billing address field 406. A payment method field 408 may be a drop-down box, a series of checkboxes, and/or a set of links to specific pages for each payment method. In some examples, a card number field 410 may have labels such as "credit card number," "debit card number," and/or "payment card number." In some embodiments, detection module 104 may assume that any sixteen digit input field is card number field 410. Detection module 104 may also look for the presence of a three digit field that may be a CVV field 412 and/or a date selection field and/or two two-digit fields that may be an expiration date field 414. In some examples, a payment page may include a bank name field 416 and/or an account number field 418. Account number field 418 may represent a bank account number or a routing number.

In some examples, detection module 104 may detect payment pages based on a certain set of input fields and/or a number of input fields above a certain threshold. In some embodiments, detection module 104 may use text labels next to the fields on a page in addition to or instead of field names. For example, a credit card field may be named anything from "cc_num" to "credit_number" to "CreditCardNumber," but regardless of the name of the field in the source code, there will likely be nearby text that is similar to "credit card number." In some embodiments, detection module 104 may use a combination of field names and the text of the page to determine whether a page is a payment page. Detection module 104 may also use other elements of the page, such as metadata, images, ratio of input fields to text, and/or any other suitable attributes of a web page.

In some embodiments, detection module 104 may include and/or have access to a list of known payment pages and/or cart software. For example, detection module 104 may recognize that a page with "paypal.com" in the address is more likely to be a payment page.

Returning to FIG. 3, at step 304, one or more of the systems described herein may determine a source of origin of the payment page. For example, determination module 106 may, as part of computing device 202 in FIG. 2, determine source of origin 212 of payment page 210.

The term "source of origin," as used herein, generally refers to the process that opened the payment page in the web browser. A source of origin may be another web page, an application, a plug-in, and/or a script. In some examples, a source of origin may include a name of an application represented by a process and/or a title of a web page represented by a process. For example, a source of origin that includes a process named "spdyclnr.exe" may include the application name "Speedy Cleaner."

Determination module 106 may determine the source of origin of the payment page in a variety of ways. In some embodiments, determination module 106 may determine the source of origin in different ways depending on the type of the source of origin.

In one example, the source of origin may include an application. In some examples, the application may include a free version of the application. For example, a free application called "Fast Registry Cleaner" may launch a browser window to pay for "Fast Registry Cleaner Pro." In some embodiments, determination module 106 may determine that the source of origin is an application in different ways based on whether the application opened the payment page in an existing Internet browser instance or launched a new Internet browser instance.

For example, determination module 106 may determine that the source of origin of the payment page is an application by identifying a parent process that initialized the payment page in the Internet browser. If the application launched a new instance of the Internet browser, then the application will be the parent process of the process that represents the Internet browser.

In other examples, determination module 106 may determine the source of origin of the payment page by identifying the application based on an API call utilized by the application to initialize the payment page in the Internet browser. If the application opened the payment page in an existing instance of the Internet browser, then determination module 106 may examine the API call that opened the payment page. For example, the application may use the ShellExecute WINDOWS API function to launch the payment page. In this example, determination module 106 may monitor calls to the WINDOWS API and may determine which application made the ShellExecute call that included the address of the payment page.

In some examples, the source of origin may include a web page in the Internet browser. For example, a user may click on an advertisement that brings them to the payment page. Many scam anti-malware applications lure users with advertisements that claim that an online version of the application has already detected malware on the user's computer, and the user must download the paid application in order to remove the malware. Scam computer optimization applications may advertise similarly, claiming to have found inefficiencies in the user's computer that the paid version of the application can fix. In other examples, a user may follow a link to the payment page from a website about the application, a forum post about the application, or any of a variety of other web pages.

In some embodiments, determination module 106 may determine the source of origin of the payment page by identifying the web page that referred the Internet browser to the payment page based on referrer data stored by the Internet browser. In some embodiments, determination module 106 may be part of a browser plug-in, such as the NORTON toolbar, that may store browsing activity. In these embodiments, determination module 106 may backtrack the user's browsing activity to determine what web page linked to the payment page. Additionally or alternatively, determination module 106 may be part of a security system that monitors Internet traffic and may determine what web page linked to the payment page based on the prior Internet traffic.

At step 306, one or more of the systems described herein may query a reputation database to determine a reputation of the source of origin of the payment page. For example, querying module 108 may, as part of computing device 202 in FIG. 2, query database 120 to determine reputation 124 of source of origin 212 of payment page 210.

Querying module 108 may query the reputation database in a variety of different contexts. For example, querying module 108 may query separate reputation databases depending on whether the source of origin is an application or a web page. In another embodiment, querying module 108 may query the same reputation database regardless. In some embodiments, querying module 108 may query multiple reputation databases and produce a weighted score based on the results from the databases. Additionally or alternatively, querying module 108 may query a preferred database first and then query additional databases if the preferred database does not have information on the source of origin.

In some examples, querying module 108 may query a reputation database that includes and whitelist of known good applications, web pages, and/or payment pages. Additionally or alternatively, querying module 108 may query a database that only stores reputation scores for untrustworthy applications, web pages, and/or payment pages.

In some embodiments, querying module 108 may query a reputation database that is stored locally. For example, querying module 108 may be part of a security system that includes a locally stored reputation database that receives updates from a security server. In another embodiment, querying module 108 may query a remotely hosted reputation database.

At step 308, one or more of the systems described herein may receive a response from the reputation database indicating that the source of origin of the payment page is untrustworthy. For example, receiving module 110 may, as part of computing device 202 in FIG. 2, receive response 214 from database 120 indicating that source of origin 212 of payment page 210 is untrustworthy.

The term "untrustworthy," as used herein, generally refers to any application that does not perform as described. For example, a registry cleaning application that claims to be able to find errors that others cannot but only checks for the most common type of error may be untrustworthy. In another example, an anti-malware application that does not scan for malware and/or pretends to remove nonexistent malware may be untrustworthy. Any application that performs a malicious function may also be untrustworthy. In some embodiments, an application may be untrustworthy if it has received negative reviews.

Receiving module 110 may receive the response from the reputation database in a variety of contexts. For example, receiving module 110 may be part of a browser plug-in that may send and receive a response from a reputation database on a security server. In another embodiment, receiving module 110 may be part of a security application that includes a reputation database and receiving module 110 may receive a response from the internal reputation database.

In some embodiments, receiving module 110 may perform calculations based on the response from the reputation database. For example, the reputation database may rate an application's trustworthiness on a score from zero to one hundred. In this example, receiving module 110 may receive a score of "45" from the reputation database and may determine that the source of origin is untrustworthy based on the source of origin having a reputation score below sixty. In another example, receiving module 110 may receive a response from the reputation database indicating that the source of origin has thirty negative reviews and five positive reviews. In this example, receiving module 110 may calculate that the source of origin is untrustworthy based on the source of origin having fewer than 80% positive reviews.

At step 310, one or more of the systems described herein may, in response to receiving the response that indicates that the source of origin of the payment page is untrustworthy, warn a user of the Internet browser that the source of origin of the payment page is untrustworthy. For example, warning module 112 may, as part of computing device 202 in FIG. 2, and in response to receiving response 214 that indicates that source of origin 212 of payment page 210 is untrustworthy, warn a user of Internet browser 208 that source of origin 212 of payment page 210 is untrustworthy.

Warning module 112 may warn the user in a variety of ways. For example, warning module 112 may add a visual indicator to the payment page in the Internet browser, such as a border, a banner, a text box, and/or an image, that indicates that the source of origin of the payment page is untrustworthy. In one embodiment, warning module 112 may inform the user of the exact rating of the source of origin in the reputation database. In another embodiment, warning module 112 may simply inform the user that the source of origin of the payment page, and thus the payment page itself, should not be trusted.

In some embodiments, warning module 112 may display a warning for the user outside of the Internet browser. For example, warning module 112 may display an alert about the untrustworthiness of the payment page.

In some examples, warning module 112 may warn the user of the Internet browser by blocking the payment page for the application from displaying in the Internet browser. For example, warning module 112 may replace the payment page in the Internet browser with a page warning the user that the source of origin of the payment page is untrustworthy. Additionally or alternatively, warning module 112 may add the payment page to a blacklist of untrustworthy payment pages. In some examples, warning module 112 may blacklist the domain of the payment page.

Figure 5:
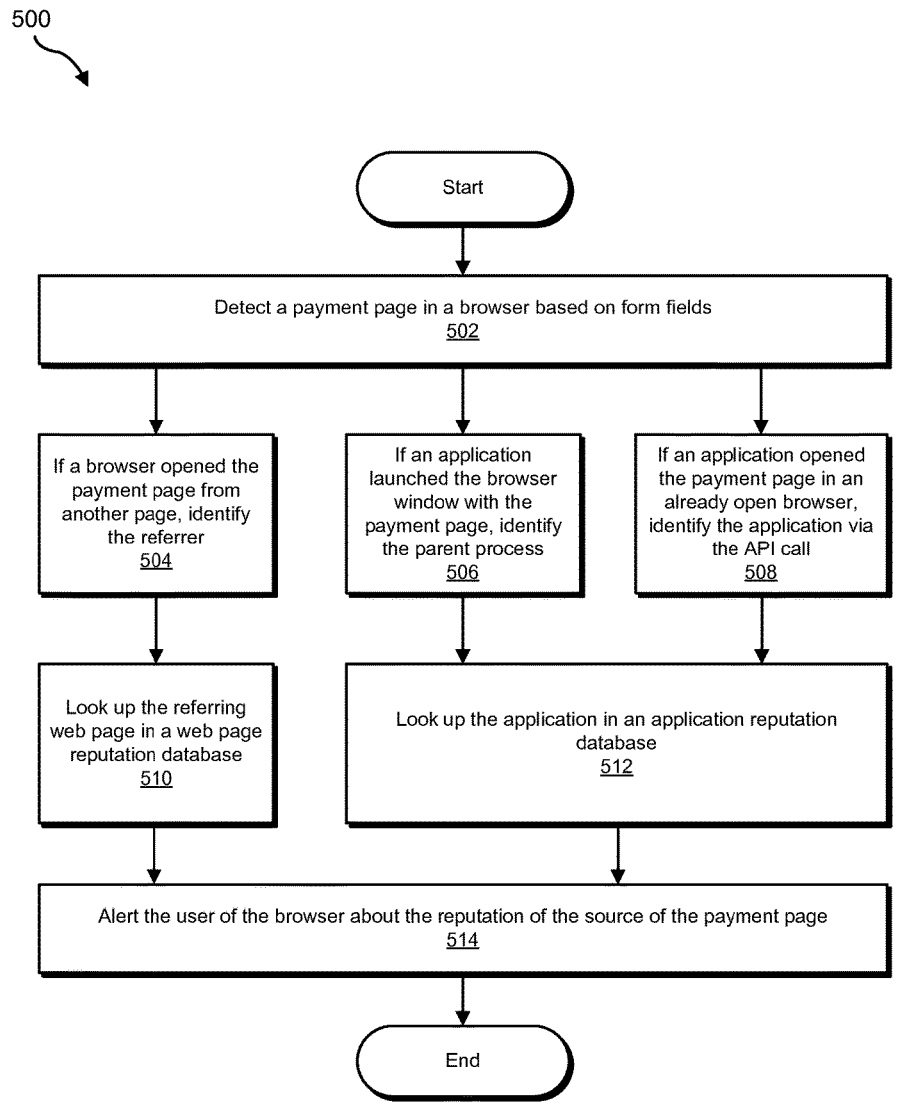
FIG. 5 is a flow diagram of an exemplary method for warning users about untrustworthy application payment pages.

As discussed above, the systems described herein may determine the trustworthiness of a payment page in a variety of ways. FIG. 5 is a flow diagram of an exemplary computer-implemented method 300 for warning users about untrustworthy application payment pages. As illustrated in FIG. 5, at step 502, the systems described herein may detect a payment page in a browser based on form fields. For example, a browser plug-in may scan for fields associated with various payment methods such as credit cards, debit cards, online payment system accounts, and/or bank accounts. Next, the systems described herein may determine the source of origin of the payment page based on how the payment page was opened. At step 504, if a browser opened the payment page, the systems described herein may identify the referrer. For example, a browser plug-in may store browsing data and may identify the web page that opened the payment page. Alternatively, at step 506, if an application launched a browser window with the payment page, the systems described herein may identify the parent process. For example, a security system may find the application associated with the process identifier of the parent process for the browser window. At step 508, if an application opened the payment page in an already open browser, the systems described herein may identify the application via the API call. For example, a security system may monitor the use of the ShellExecute command and may identify the application that called the ShellExecute command with the address of the payment page as an argument.

Once the source of origin of the payment page is identified, the systems described herein may query a reputation database. If the source of origin is a web page, at step 510 the systems described herein may look up the referring web page in a web page reputation database. For example, a browser plug-in may look up the web page in the WEB OF TRUST web page reputation database. If the source of origin is an application, at step 512 the systems described herein may look up the application in an application reputation database. For example, a security system may query an application reputation database on a security server. Either way, one the reputation of the source of origin has been determined, at step 514 the systems described herein may alert the user of the browser about the reputation of the source of the payment page. In some embodiments, the systems described herein may inform the user if the source of origin has a positive, neutral, and/or unknown reputation. In other embodiments, the systems described herein may only warn the user if the reputation is negative.

As described in connection with method 300 above, the systems described herein may help a user determine whether an application for which they are paying is trustworthy or a scam. The systems described herein may monitor web pages opened by an Internet browser and trigger further action whenever a payment page is detected. If the payment page was launched by another web page, the systems described herein may check the web page in a website reputation database. If the payment page was launched by an application, the systems described herein may determine which application launched the payment page and then look up the application in an application reputation database. Either way, if the reputation database responds that the web page or application that launched the payment page is untrustworthy, the systems described herein may alert the user that the payment page is associated with an untrustworthy source and should not be used. By alerting users to untrustworthy payment pages, the systems described herein may prevent users from wasting money on scam applications and/or having their payment information stolen.

Figure 6:
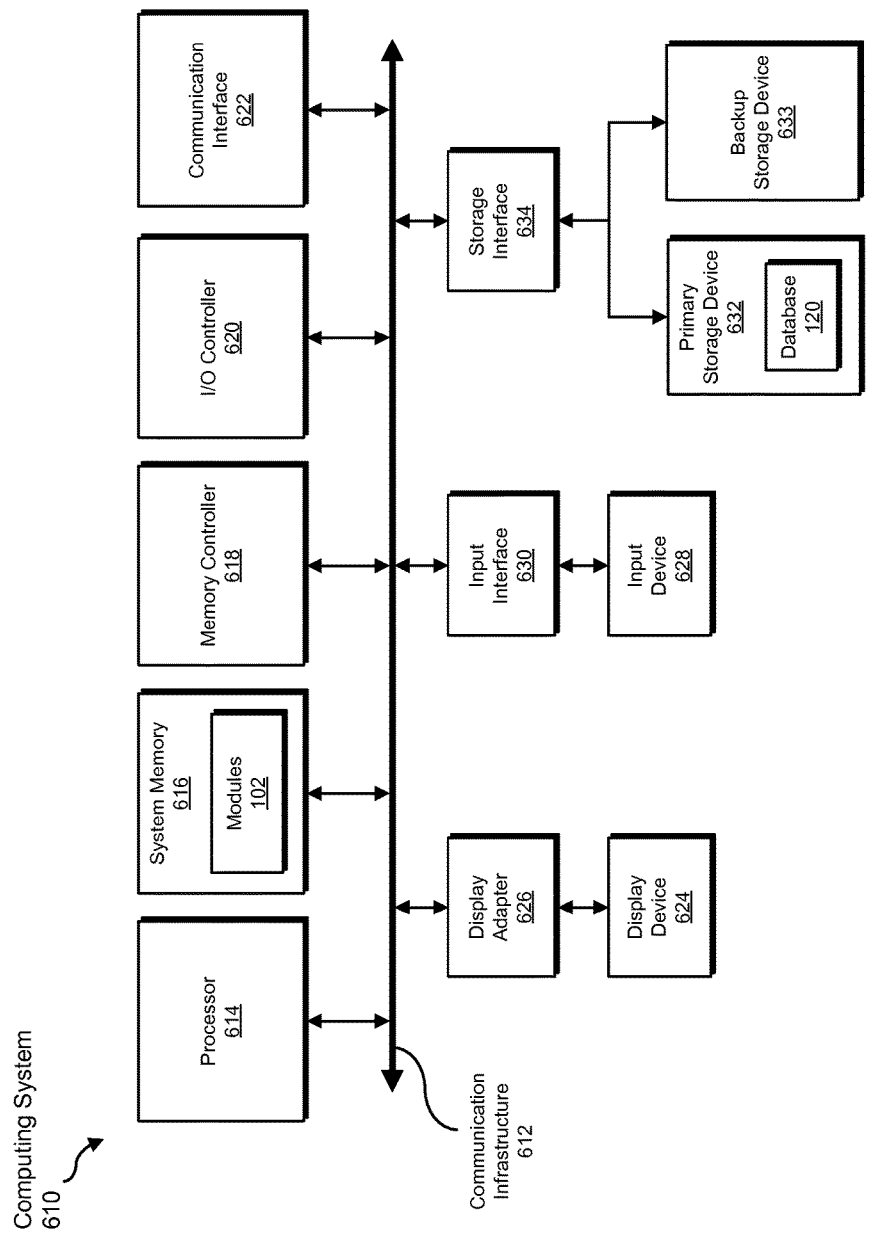
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
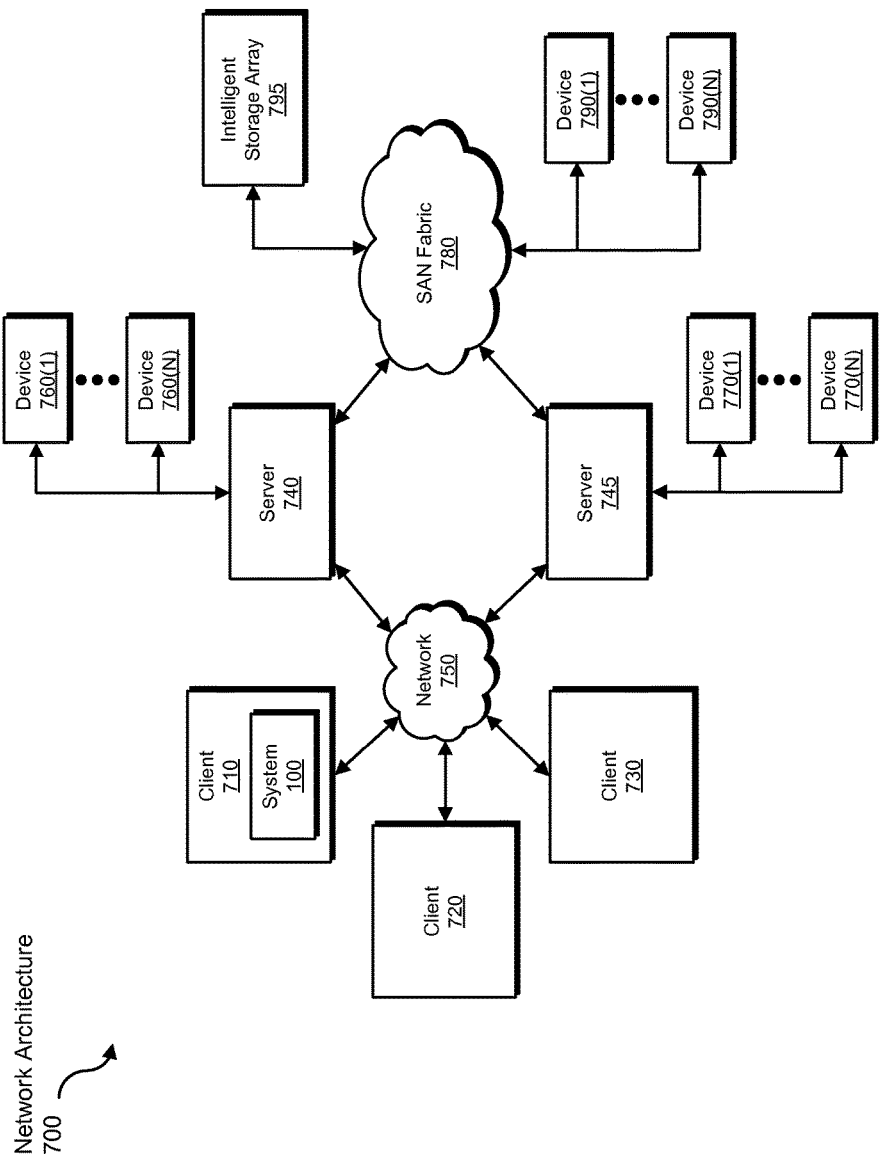
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for warning users about untrustworthy application payment pages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive web page data to be transformed, transform the web page data into further web page data and/or application data, output a result of the transformation to a reputation database, use the result of the transformation to warn a user, and store the result of the transformation to a security system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for warning users about untrustworthy application payment pages, at least a portion of the method being performed by a computing device comprising at least one processor, the method comprising:
   detecting, within an Internet browser, a payment page to purchase an application, wherein detecting the payment page comprises:
      initiating a web page in the Internet browser;
      examining the web page initiated in the Internet browser for one or more fields associated with financial transactions; and
      identifying the initiated web page as the payment page when the web page includes the one or more fields;
   determining a source of origin of the payment page, wherein determining the source of origin comprises backtracking browsing activity of a user of the Internet browser and identifying a web page that is linked to the payment page;
   querying a reputation database to determine a reputation of the source of origin of the payment page;
   receiving a response from the reputation database comprising a numerical value associated with a trustworthiness score;
   and
   warning the user that the source of origin of the payment page is untrustworthy based on the trustworthiness score.

2. The computer-implemented method of claim 1, wherein
   determining the source of origin of the payment page further comprises identifying a parent process that initiated the payment page in the Internet browser, wherein the parent process comprises a free version of the application for purchase.

3. The computer-implemented method of claim 1, wherein
   determining the source of origin of the payment page further comprises identifying an additional application that initiated the payment page in the Internet browser, wherein the additional application is identified based on an application programming interface call for initiating the payment page in the Internet browser.

4. The computer-implemented method of claim 1, wherein
   determining the source of origin of the payment page further comprises identifying an additional web page, wherein the additional web page refers the Internet browser to the payment page based on referrer data stored by the Internet browser.

5. The computer-implemented method of claim 1, wherein the one or more fields associated with the financial transactions comprises, at least one of:
   a payment card number field;
   a payment card verification value field;
   a payment card expiration date field;
   a payment card owner name field;
   a billing address field;
   a payment method selection field;
   a bank name field.

6. The computer-implemented method of claim 1, wherein warning the user of the Internet browser comprises blocking the payment page from displaying in the Internet browser.

7. A system for warning users about untrustworthy application payment pages, the system comprising:
   a detection module, stored in memory, that detects, within an Internet browser, a payment page to purchase an application, wherein the detection module detects the payment page by:
      initiating a web page in the Internet browser;
      examining the web page initiated in the Internet browser for one or more fields associated with financial transactions; and
      identifying the web page is the payment page when the web page includes the one or more fields;
   a determination module, stored in memory, that determines a source of origin of the payment page, wherein the source of origin is determined by backtracking browsing activity of a user of the Internet browser and identifying a web page that is linked to the payment page;
   a querying module, stored in memory, that queries a reputation database to determine a reputation of the source of origin of the payment page;
   a receiving module, stored in memory, that:

receives a response from the reputation database comprising a numerical value associated with a trustworthiness score;

a warning module, stored in memory, that, in response to receiving the response that indicates that the source of origin of the payment page is untrustworthy, warns the user of the Internet browser that the source of origin of the payment page is untrustworthy based on the trustworthiness score; and at least one physical processor configured to execute the detection module, the determination module, the querying module, the receiving module, and the warning module.

8. The system of claim 7, wherein the determination module further determines the source of origin of the payment page by identifying a parent process that initiated the payment page in the Internet browser, wherein the parent process comprises a free version of the application for purchase.

9. The system of claim 7, wherein the determination module further determines the source of origin of the payment page by identifying an additional application that initiated the payment page in the Internet browser, wherein the additional application is identified based on an application programming interface call for initiating the payment page in the Internet browser.

10. The system of claim 7, wherein the determination module further determines the source of origin of the payment page by identifying an additional web page, wherein the additional web page refers the Internet browser to the payment page based on referrer data stored by the Internet browser.

11. The system of claim 7, wherein the one or more fields associated with the financial transactions comprises at least one of:
a payment card number field;
a payment card verification value field;
a payment card expiration date field;
a payment card owner name field;
a billing address field;
a payment method selection field;
a bank name field.

12. The system of claim 7, wherein the warning module warns the user of the Internet browser by blocking the payment page from displaying in the Internet browser.

13. A non-transitory computer-readable medium comprising one or more computer-readable instructions that, when executed by at least one processor of a computing device, cause the computing device to:
detect, within an Internet browser, a payment page to purchase an application, wherein the payment page is detected by:
initiating a web page in the Internet browser;
examining the web page initiated in the Internet browser for one or more fields associated with financial transactions; and
identifying the initiated web page as the payment page when the web page includes the one or more fields;
determine a source of origin of the payment page, wherein the source of origin is determined by backtracking browsing activity of a user of the Internet browser and identifying a web page that is linked to the payment page;
query a reputation database to determine a reputation of the source of origin of the payment page;
receive a response from the reputation database comprising a numerical value associated with a trustworthiness score;
and
warn the user of the Internet browser that the source of origin of the payment page is untrustworthy based on the trustworthiness score.

14. The non-transitory computer-readable medium of claim 13, wherein the one or more computer-readable instructions cause the computing device to further determine the source of origin of the payment page by identifying a parent process that initiated the payment page in the Internet browser, wherein the parent process comprises a free version of the application for purchase.

15. The non-transitory computer-readable medium of claim 13, wherein the one or more computer-readable instructions cause the computing device to further determine the source of origin of the payment page by identifying an additional application that initiated the payment page in the Internet browser, wherein the additional application is identified based on an application programming interface call for initiating the payment page in the Internet browser.

16. The non-transitory computer-readable medium of claim 13, wherein the one or more computer-readable instructions cause the computing device to further determines the source of origin of the payment page by identifying an additional web page, wherein the additional web page refers the Internet browser to the payment page based on referrer data stored by the Internet browser.

17. The non-transitory computer-readable medium of claim 13, wherein the one or more fields associated with the financial transactions comprises at least one of:
a payment card number field;
a payment card verification value field;
a payment card expiration date field;
a payment card owner name field;
a billing address field;
a payment method selection field;
a bank name field.

18. The non-transitory computer-readable medium of claim 13, wherein the one or more computer-readable instructions cause the computing device to warn the user of the Internet browser by blocking the payment page from displaying in the Internet browser.

* * * * *